US00RE38714E

(19) United States
(12) Reissued Patent
Pope, Jr. et al.

(10) Patent Number: US RE38,714 E
(45) **Date of Reissued Patent: *Mar. 22, 2005**

(54) ELECTRICAL SAFETY DEVICE

(76) Inventors: Ralph E. Pope, Jr., 3680 Ryans Bluff Dr., Cumming, GA (US) 30040; Kenneth S. Watkins, Jr., 2760 River Dr., Dahlonega, GA (US) 30533

( * ) Notice: This patent issued on a continued prosecution application filed under 37 CFR 1.53(d), and is subject to the twenty year patent term provisions of 35 U.S.C. 154(a)(2).

(21) Appl. No.: 09/126,508

(22) Filed: Jul. 30, 1998

Related U.S. Patent Documents

Reissue of:
(64) Patent No.: 5,541,803
Issued: Jul. 30, 1996
Appl. No.: 08/206,966
Filed: Mar. 7, 1994

(51) Int. Cl.[7] ..... H02H 5/04
(52) U.S. Cl. ..... 361/103; 219/494
(58) Field of Search ..... 361/103, 106; 219/110, 241, 485, 488, 489–491, 494, 497, 501, 510; 315/150, 158, 159

(56) References Cited

U.S. PATENT DOCUMENTS 2,501,499 A * 3/1950 Crowley ..... 219/20
3,027,496 A * 3/1962 Donath ..... 317/133.5
3,610,808 A * 10/1971 Horwinski ..... 174/115
3,769,549 A * 10/1973 Bargert, Jr. ..... 361/103
4,063,447 A * 12/1977 Mathison ..... 73/27 R
4,577,094 A * 3/1986 Mills ..... 219/505
4,607,154 A * 8/1986 Mills ..... 219/509
4,677,281 A * 6/1987 Mills ..... 219/501
4,707,686 A * 11/1987 Greenhalgh ..... 219/505
4,891,500 A * 1/1990 Bloore ..... 219/505
4,894,513 A * 1/1990 Koontz ..... 219/494
5,221,916 A * 6/1993 McQueen ..... 219/544
5,360,962 A * 11/1994 Pettit ..... 219/497
5,424,895 A * 6/1995 Gaston ..... 361/103
5,862,030 A * 1/1999 Watkins, Jr. et al. ..... 361/103

FOREIGN PATENT DOCUMENTS

DE 2063 289 6/1972 ..... H02H/7/00

* cited by examiner

*Primary Examiner*—Ronald W. Leja
(74) *Attorney, Agent, or Firm*—Alston & Bird LLP

(57) ABSTRACT

An electrical safety device is disclosed which utilizes a sensor conductor configured in a continuous loop and disposed in an electrical component so as to sense overtemperature or mechanical damage over a length or wide area of the component. The sensor may be simple insulated or non insulated copper wire. A low voltage potential is maintained across the sensor conductor. The sensor circuitry includes ambient temperature compensation.

29 Claims, 9 Drawing Sheets

ELECTRICAL SAFETY DEVICE

Matter enclosed in heavy brackets [ ] appears in the original patent but forms no part of this reissue specification; matter printed in italics indicates the additions made by reissue.

BACKGROUND

The present invention relates generally to an electrical safety device and more specifically to a temperature control device utilizing a sensing conductor to provide overtemperature and mechanical damage protection for extension cords, electrical power cords, and electrical components. The sensing conductor is housed within electrical power cords, cables and components so as to sense temperature changes or mechanical damage over a length of the electrical cable or over the surface of the electrical component case or internal parts.

Electric powered devices are subject to numerous conditions which can result in fire, injury by burning, injury by shock or release of toxic fumes. For example, aging or mechanically damaged electrical insulation results in local shorts and overheating due to large currents. Another frequent cause of overheating in electric motors is mechanical overload or stalling resulting in excessive current. Electrical or electronic devices which are fan or conduction cooled will overheat if the cooling medium or transport method fails. A safe, reliable and inexpensive safety device is needed to sense dangerous electrical conditions such as overheating and mechanical damage which threaten life and property.

Numerous devices for sensing overtemperature conditions have been previously disclosed and claimed. Up to now, these safety devices have not enjoyed widespread use due to cost, complexity, electrical or mechanical limitations as well as safety concerns for the device itself.

Some previously disclosed safety devices depend on overcurrent protection to sense overheating or fire. This type of protection may not be effective for all parts of a device, especially if the problem is mechanical damage, such as the breaking of some of the strands of a current carrying wire or a defective electrical connection due to corrosion or poor contact. A section of the device or cord may become dangerously overheated without tripping the overcurrent protection device.

Other safety devices sense the temperature at points along the electric cord or at points within the electrical component. For example, fusible links which melt and open a circuit upon overtemperature conditions have been used. Other devices employ thermistors, RTDs or other temperature sensitive elements which, in conjunction with a sensing and control circuit, monitor temperature of the sensor and reduce or cut power to the device if the sensor overheats. Because these devices detect overheating conditions only at certain points, the safety devices protect only discrete locations; dangerous overheating conditions at other unprotected points may go undetected. In addition, protection of a long electrical cord or a number of components is not practical using thermistors, RTDs, or junction devices due to weight, bulk, and cost.

Linear sensing means provides protection over a continuous length, thereby sensing safety problems over the length of the electrical cord. Linear sensing means can potentially reduce weight, bulk and cost in many applications. However, linear sensing has several drawbacks. If electrical impedance change in a conductor as a function of temperature is used as the sensing method, a large temperature change in a short length of the conductor is equivalent in impedance change to a small temperature difference for the entire length. This leads to difficulties if the sensing circuitry is made sensitive enough to respond to a localized high temperature condition; a small ambient temperature change will cause unwanted alarm, or trip of the unit.

Safety devices which detect temperature over a distance have been used in applications such as electric heating blankets or in high voltage transmission lines. Some linear detection devices utilize specialized dielectric coatings between conductors which change electrical characteristics as a function of temperature, but these materials add to the cost, complexity, and, in some cases, reliability problems due to environmental, mechanical or aging effects on these materials. Other linear detection devices utilize line voltage AC applied to the sensor wire which can present a safety hazard for electric shock. These safety devices which detect overtemperature over a distance are not designed to detect mechanical damage which could lead to shock or fire dangers.

In U.S. Pat. No. 4,577,094 issued Mar. 18, 1986, a sensory and control device for electrical heating apparatus is disclosed and claimed. The sensory function is performed by a linear conductor with a positive temperature coefficient, placed so as to sense and control heat produced by a heating element. No method is disclosed for ambient temperature compensation. Furthermore, the sensory wire is not disposed to detect mechanical damage to the protected device.

In U.S. Pat. No. 2,501,499 issued Mar. 21, 1950, an electric heating control device is disclosed which incorporates ambient temperature compensation. No method is disclosed for sensing mechanical damage to a device.

Until now, no device has been available for wide application in electric power cords, extension cords, and other electrical devices to sense overtemperature or mechanical damage over a wide area of an electrical component and which is reliable, inexpensive, and safe. The needed safety device should utilize low cost sensing wire and low cost manufacturing processes. It should provide the safety of low voltage sensing. It should compensate for ambient temperature to reduce spurious trips and improve sensitivity. And it should provide expanded mechanical damage sensing protection to further protect the user from electrical shock as well as fire hazards.

SUMMARY

The present invention addresses the need for a safety device for electrical components which can sense either overtemperature conditions or possible dangerous mechanical damage to the component over a wide area. It consists of a continuous loop of a low cost sensing conductor, such as simple copper wire, positioned in the electrical component so that at least part of the conductor loop is positioned between an energized part of the electrical component and the outside surface of the component, a reference conductor placed to sense ambient temperature and a sensor/controller unit.

Power for the electrical component to be protected is supplied from a power source through the sensor/controller unit. The sensor/controller unit comprises two circuit functions. The sensor circuit measures the difference between the resistance of the sensor and reference conductors by imposing a low voltage potential across the conductors. The controller circuit de-energizes the electrical component when the difference in resistance of the sensor conductor and the reference conductor reach a predetermined value, as would be caused by an overtemperature condition of the electrical component as sensed by the sensor conductor.

The position of the sensor conductor also results in a high probability of sensor conductor breakage if the electrical component is damaged. The sensor/controller senses this breakage as loss of continuity (high resistance) of the sensor conductor and interrupts power to the electrical component. This additional personal/property protection is provided to reduce the possibility of exposure to energized parts.

BRIEF DESCRIPTION OF THE DRAWINGS

These and other features, aspects, and advantages of the present invention will become better understood with regard to the following description, appended claims, and accompanying drawings where:

FIG. 8 is a cross section of the appliance cord of FIG. 17;

FIG. 9 is a perspective drawing showing the present invention utilized in an electronic component;

DETAILED DESCRIPTION

Figure 1:
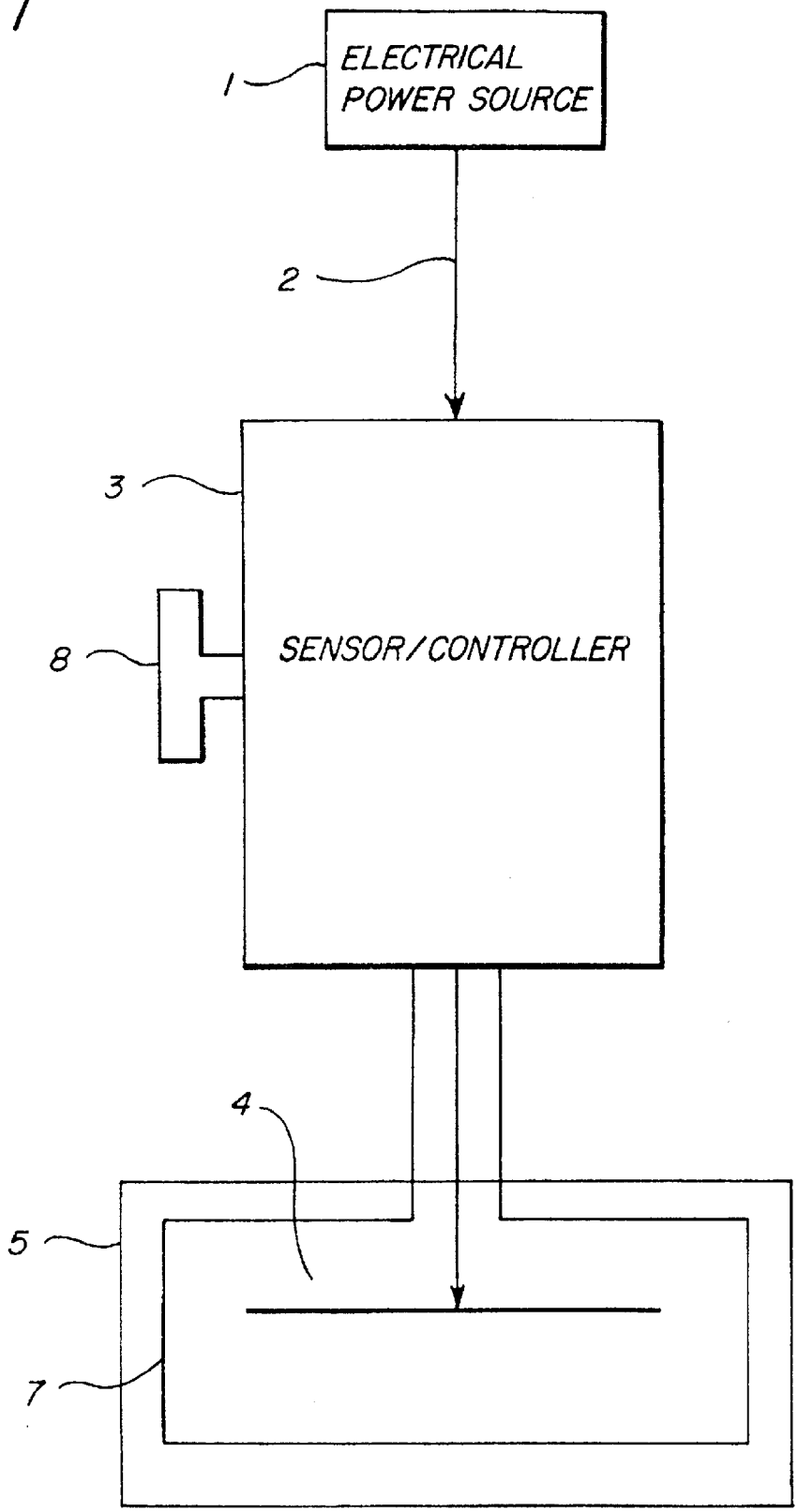
FIG. 1 is a block diagram of the electrical safety device.

FIG. 1 is a block diagram of the present invention. An electrical power source 1 supplies line voltage 2 to sensor/controller 3. Sensor/controller 3 in turn supplies power to a current carrying means 4 in protected electrical component 5. Sensor conductor 7 is positioned between the current carrying means 4 and an outside surface of electrical component 5, and forms a continuous loop connected to sensor/controller 3. Reference conductor 8 is also connected to sensor/controller 3 and is positioned to sense ambient temperature of the electrical component. Both sensor conductor 7 and reference conductor 8 are chosen to have a similar temperature coefficient of resistance. Sensor/controller 3 comprises a means to measure the difference in resistance of the sensor and reference conductors by producing a low voltage potential across the conductors. Low voltage is meant to be a potential which will not result in a substantial shock hazard (nominally less than 30 volts), but in its preferred embodiment, the potential is less than one volt. When the difference in resistance of the sensor and reference conductor reaches a set value (representing an overheated condition of the sensor conductor), the sensor/controller interrupts power to the current carrying means of the electrical component. In the preferred embodiment, power remains interrupted until the overtemperature condition is removed and the sensor/controller is reset by the user. The sensor/controller also includes a means which detects continuity of the sensor conductor and interrupts power to the current carrying means 4 of the electrical device 5 upon loss of continuity.

The location of sensor conductor 7 is critical to the operation of the invention. Placed between an energized wire or part of the protected electrical component and the outside surface of the protected device, the sensor conductor performs two separate safety function. First, it senses an overtemperature condition whether from inside or outside the protected device, and, secondly, the sensor conductor placement results in a high probability that the sensor conductor will be broken as a result of physical damage such as shock, trauma, cutting, deterioration, or corrosion to the protected component prior to the energized wire or part being exposed. Since the sensor/controller detects loss of continuity, the protected electrical component will be de-energized before the energized wire or part is exposed. The gauge or thickness of the sensor conductor as well as the sensor conductor material and placement in the protect device are chosen to increase the probability of sensor conductor breakage upon one of the aforementioned conditions. Safety is further improved by use of a low voltage applied to the sensor conductor, so that even if exposed or touched, the sensor conductor will not present a shock hazard.

It is necessary for at least a portion of the sensor conductor to be placed between the current carrying element or energized wire or part of the protected electrical component and an outside surface of the protected electrical component. In the preferred embodiment a substantial portion of the sensor conductor is placed in this position to increase the length of sensor conductor that is in a protective position as described earlier. Ideally, multiple paths and loops of continuous sensor conductor would be distributed in the protected component as described, so that the maximum amount of the protected device is protected from overheating. Any feasible mishandling or damage to the device would result in breakage of the sensor conductor and the resulting de-energizing of the component. Another benefit of increased length or the sensor conductor is that the impedance of the sensor conductor loop is increased, reducing the current requirements of the device for a given reference voltage maintained across the bridge circuit of the embodiment discussed later.

Likewise, the placement of the reference conductor is important to the operation of the device. Ideally, the reference conductor senses only ambient temperature and therefore would be located remote from the rest of the protected component. Often this is not practical, especially in consumer electrical equipment, so the reference conductor could be located on the component or piece of equipment in a position which would sense ambient temperature and be in a location away from possible heat producing parts of the component. This may commonly be on an outside surface, such as the back or bottom of the component.

Figure 2:
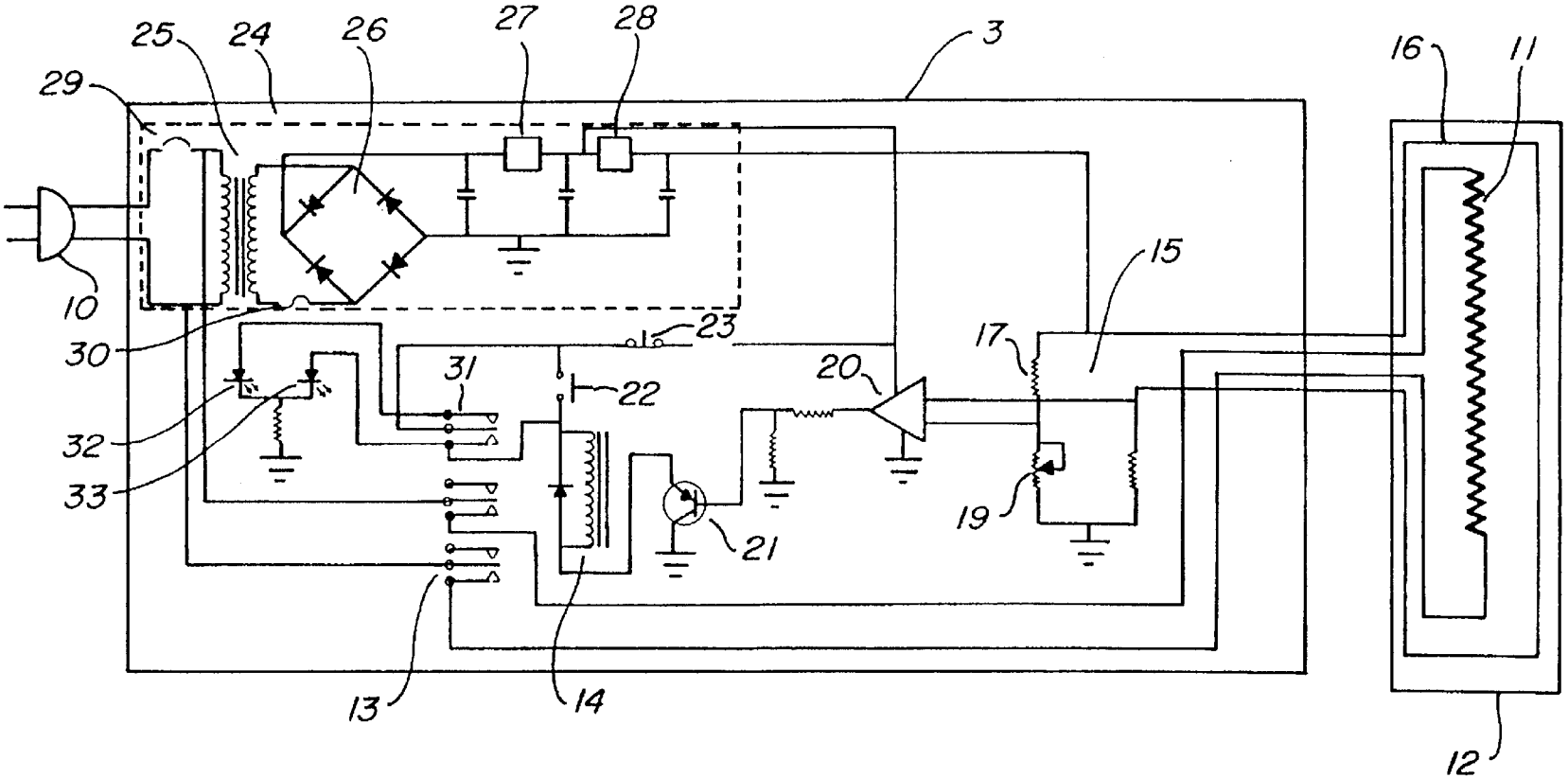
FIG. 2 is a schematic diagram of the preferred embodiment of the present invention.

FIG. 2 shows a schematic diagram of the preferred embodiment of the present invention. AC line voltage is supplied from AC plug 10 to a current carrying means 11 of electrical component 12 through an interrupting means (control contacts 13 of protective relay 14). Sensor conductor 16 disposed substantially between the current carrying means 11 and the surface of the electrical component 12 consists of a conductor, such as copper wire with a positive temperature coefficient of resistivity and forms one leg of a bridge circuit 15. Reference conductor 17, a conductor with a similar temperature coefficient of resistivity as the sensor conductor, forms a second leg to bridge circuit 15. Output of the bridge 15 is connected to an operational amplifier or comparator 20 whose output energizes or de-energizes control relay 14 through relay driver 21. Control relay contacts 31 latch control relay 14 in the energized position and control indicator LEDs for "tripped" 32 and "on" 33. Momentary "on" switch 22 turns on electrical component 12 and momentary "off" switch 23 trips or turns off the component 12. Momentary "on" switch 22 also ensures that the device has to be manually "reset" to restore current to the electrical component after a trip condition. Variable conductor 19 is used to adjust the trip point of the device by balancing or unbalancing the bridge circuit 15 as required. Power supply 24 comprises a circuit breaker or fuse 29 for load protection, isolation transformer 25, bridge rectifier 26 and voltage regulators 27 and 28. Voltage regulator 27 supplies circuit and control voltage to the operational amplifier, driver, relay and indicator circuits and is typically 5–12 VDC. Voltage regulator 28 supplies a regulated voltage to the bridge circuit and is typically less than one volt.

The location of sensor conductor 16 and reference conductor 17 in bridge 15, and the connection of operational amplifier 20 and relay driver 21 are chosen so an increasing temperature at sensor conductor 16 results in de-energizing control relay 14 and therefore de-energizing the current carrying means of electrical component 12. This arrangement ensures "fail safe" operation upon loss of power supply 24, or failure (opening) of sensor conductor 16, operational amplifier 20, relay driver 21, or control relay 14. The use of a sensor conductor with a positive temperature coefficient of resistivity in this arrangement also acts as a continuity sensor in that a break anywhere in the sensor conductor loop will result in a "high" resistance as sensed by the bridge circuit and open control relay 14, thereby de-energizing the protected component.

A fault in the sensor/controller module 31 could be protected by a portion of the sensor wire embedded in the module 31. However, depending on its location, the reference conductor 17 may become overheated as well, thereby preventing a sensor conductor 16 induced thermal trip. To give additional protection for such a case, a fusible link 30 is included in the module to turn off the module 3 and electrical component 12 upon module overtemperature.

Figure 3:
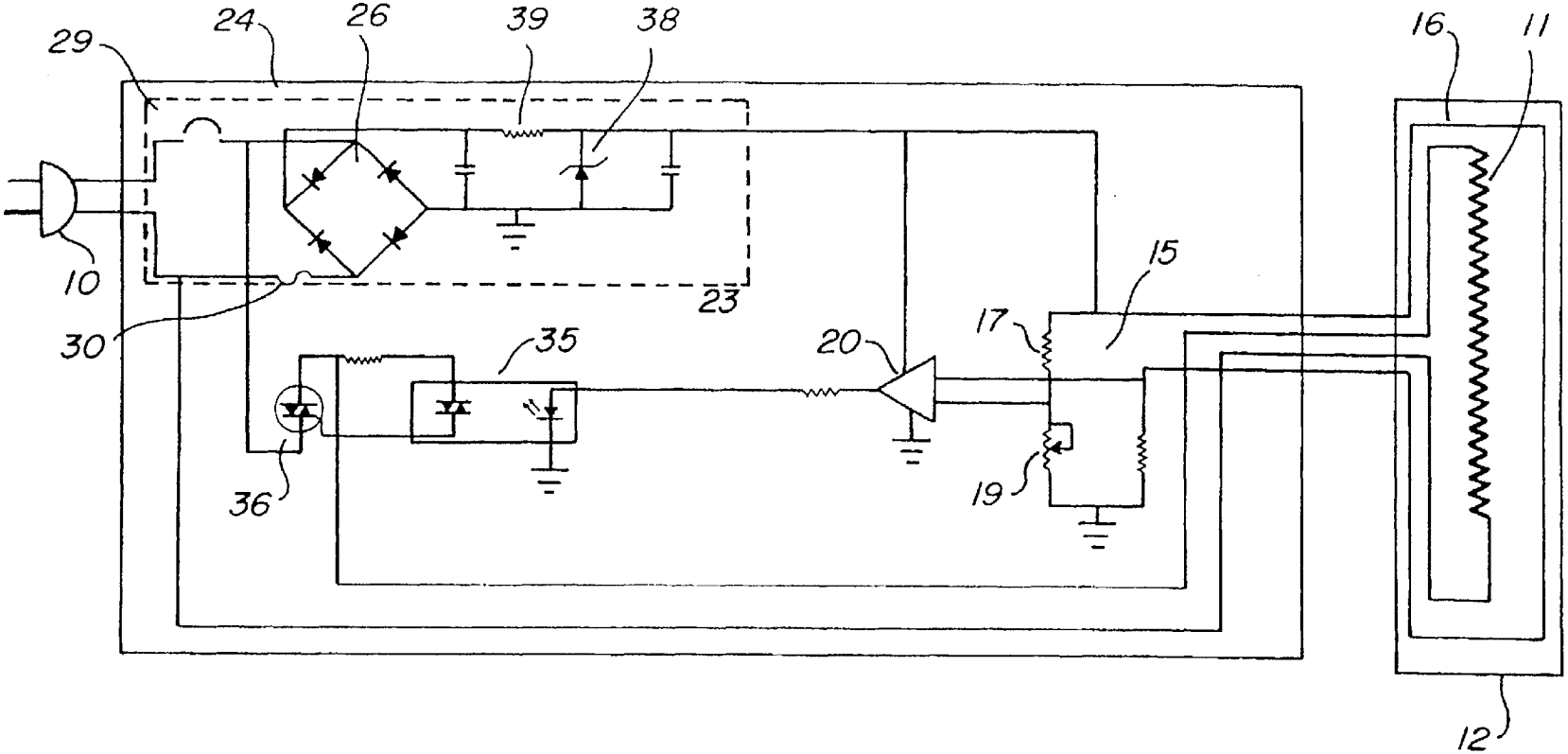
FIG. 3 is a schematic diagram of an alternative embodiment of the present invention.

FIG. 3 is an alternative embodiment of the present invention. A solid state switch such as a triac 36 is used to interrupt the current carrying means 11 of electrical component 12. The triac is controlled by the output of operational amplifier 20 through an isolated solid state coupler such as an opto-coupler 35. Low voltage DC for the bridge circuit 15 and operational amplifier 20 is supplied through a rectifier bridge 34, solid state breakdown device such as a zener diode 38, and dropping resistor 39. This device could be used in a control application because no manual reset is required to restore current to the electrical component 12.

Figure 4:
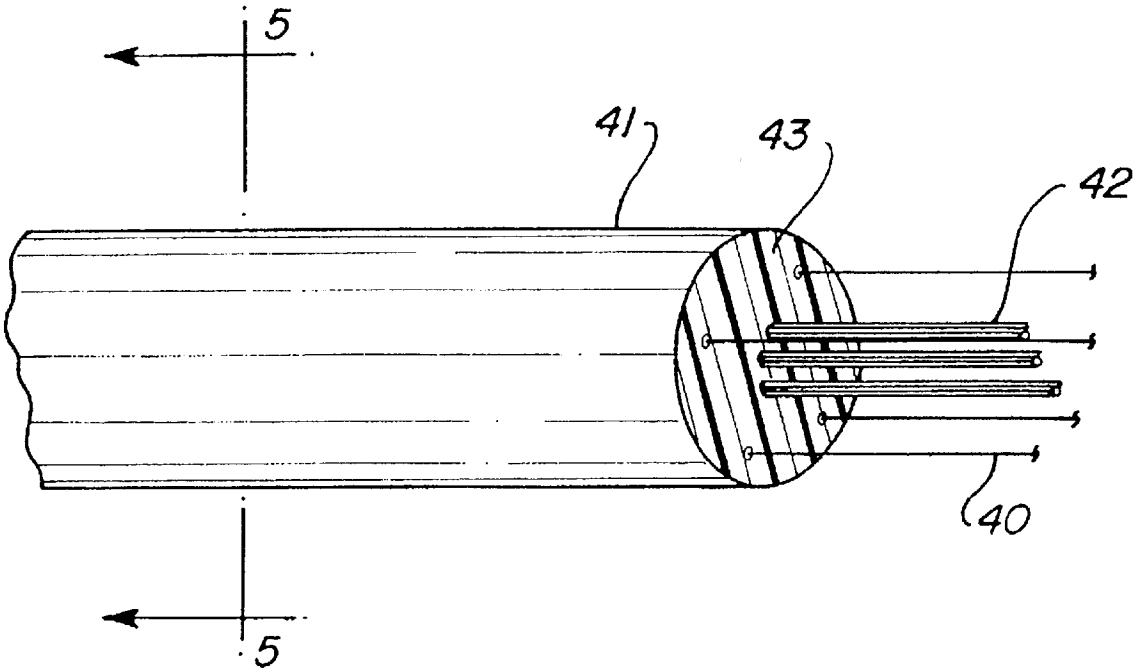
FIG. 4 is a perspective drawing showing a method of placement of the sensing conductor in a power cord.

FIG. 4 shows a method of placement of the sensor conductor 40 in a power cord 41. The sensor conductor 40 is parallel to current carrying conductors 42 and located in the insulation portion 43 between the current carrying conductors 42 and the outside of the insulation. The sensor conductors 40 are connected at the ends to form a continuous loop at one end (not shown).

Figure 5:
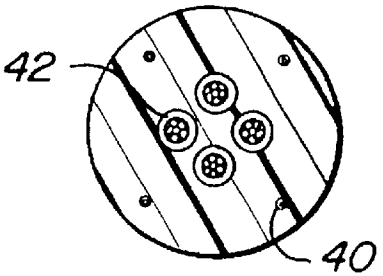
FIG. 5 is a cross-section of FIG. 4.

FIG. 5 is a cross-section of FIG. 4 showing placement of sensor conductors 40.

Figure 6:
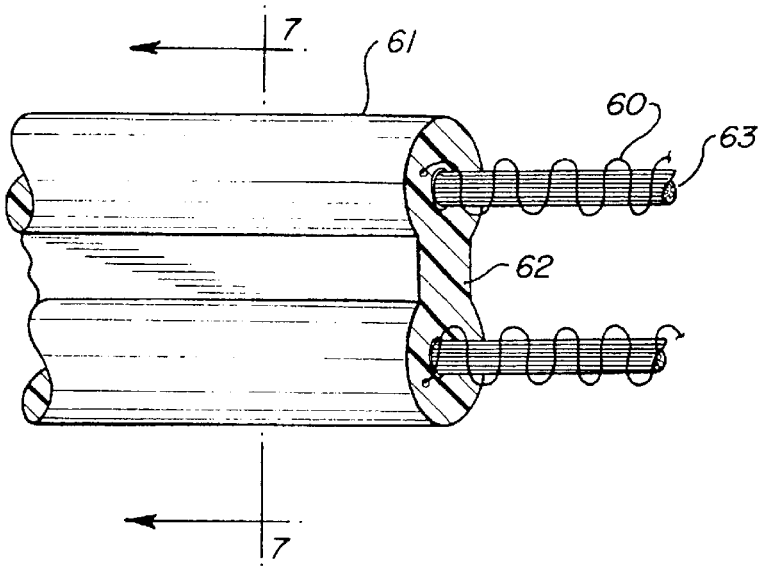
FIG. 6 is a perspective drawing showing another method of placement of sensor conductor in a power cord.

FIG. 6 shows another method of placement of sensor conductor 60 in a power cord 61. Sensor conductor 60 is fashioned in a "sinusoidal" or "snake" pattern in the insulation portion 62 of the power cord 61 between the current carrying conductors 63 and the outside of the power cord 61. The particular shape of the sensor conductor placement increases the flexibility of the power cord and reduces the possibility of inadvertent damage to the sensor conductor due to normal handling and use of the cord.

Figure 7:
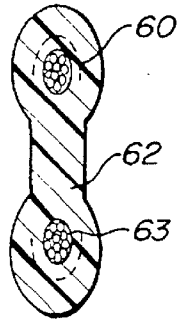
FIG. 7 is a cross-section of FIG. 6.

FIG. 7 is a cross-section of FIG. 6 showing placement of sensor conductor 60.

Figure 8:
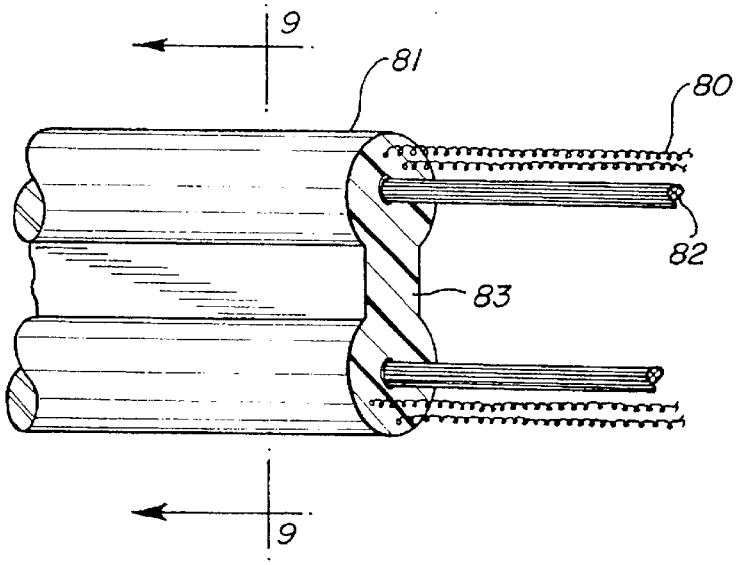
FIG. 8 is a perspective drawing showing yet another placement of sensor conductor in an electrical cord.

FIG. 8 shows yet another placement of sensor conductor 80 in an electrical cord 81. Sensor conductor 80 is wound in a helical shape and placed parallel to current carrying conductors 82 in the insulated portion 83 of the cord 81 between the current carrying conductor 82 and the outside of the cord 81. The particular shape of the sensor conductor placement increases the flexibility of the power cord and reduces the possibility of inadvertent damage to the sensor conductor due to normal handling and use of the cord.

Figure 9:
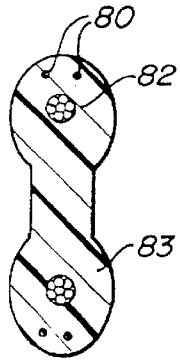
FIG. 9 is a cross-section of FIG. 8.

FIG. 9 is a cross-section of FIG. 8 showing placement of sensor conductor 80.

Figure 10:
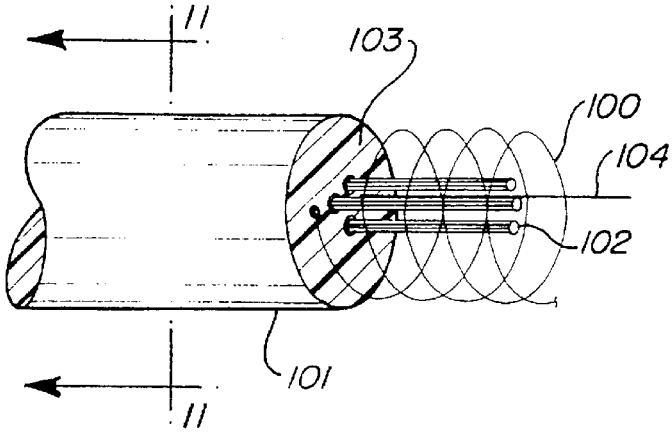
FIG. 10 is a perspective drawing showing still another placement of sensor conductor in an electrical cord.

FIG. 10 shows still another placement of sensor conductor 100 in an electrical cord 101. Sensor conductor is wound in a helical shape surrounding current carrying conductors 102 in the insulated portion 103 of the cord. A second sensor conductor 104 is shown in the center of the cord to allow forming a continuous loop from one end of the cord. The particular shape of the sensor conductor placement increases the flexibility of the power cord and reduces the possibility of inadvertent damage to the sensor conductor due to normal handling and use of the cord.

Figure 11:
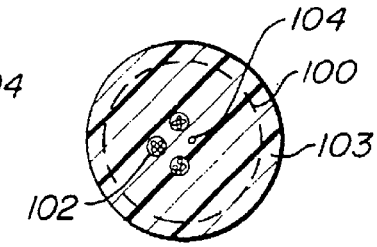
FIG. 11 is a cross-section of FIG. 10.

FIG. 11 is a cross-section of FIG. 10 showing placement of sensor conductors 100 and 104.

Figure 12:
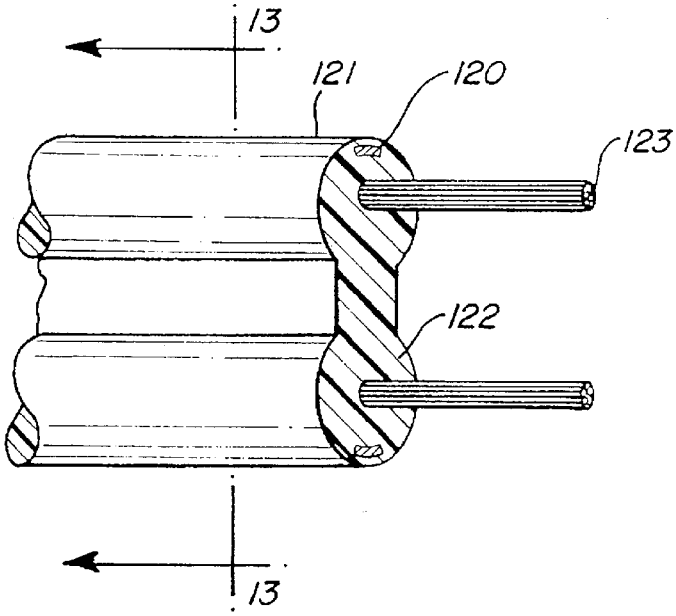
FIG. 12 is a perspective drawing showing yet another placement of sensor conductor in an electrical cord.

FIG. 12 shows yet another placement of sensor conductor 120 in an electrical cord 121. Sensor conductor 120 consists of a conductive elastomer which is extruded as separate strips in the insulation portion 122 during manufacture. The sensor conductor 120 is parallel to, and located between, current carrying conductor 123 and the outside of electrical cord 121.

Figure 13:
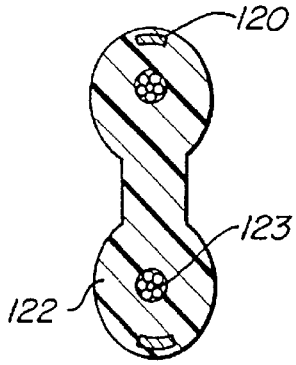
FIG. 13 is a cross-section of FIG. 12.

FIG. 13 is a cross-section of FIG. 12 showing location of sensor conductor 120.

Figure 14:
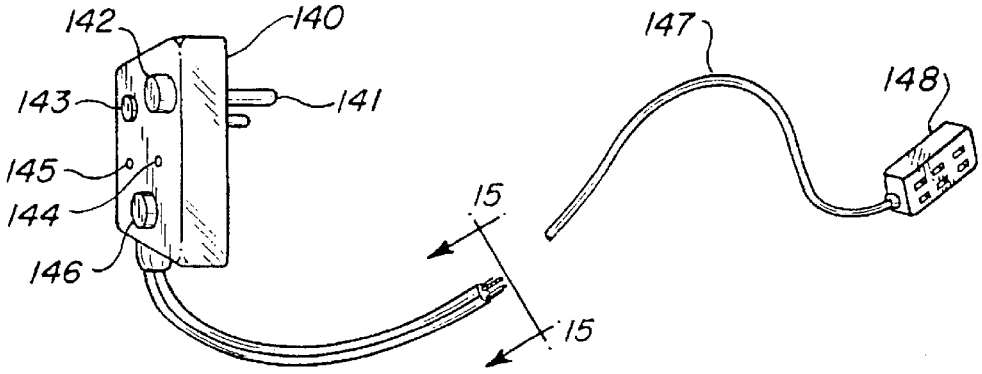
FIG. 14 is a perspective drawing showing the preferred embodiment of the invention adapted to an electrical extension cord.

FIG. 14 shows the preferred embodiment of the invention adapted to an electrical extension cord. Plug-in module 140 contains the sensing/controller circuitry (not shown), AC plug ends 141, "on/reset" switch 142, "off" switch 143, "on" LED 144, "off" LED 145, and reference conductor 146. Electrical cord 147 connects plug-in module 140 with receptacle end 148.

Figure 15:
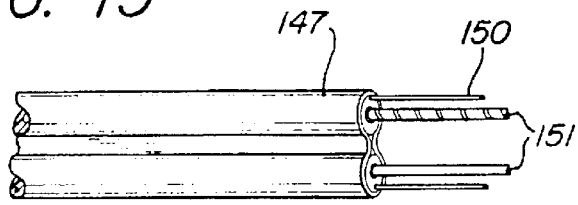
FIG. 15 is a detail cutaway of FIG. 14 showing the location of sensor conductors disposed in the insulated portion of cord.

FIG. 15 is a detail cutaway of FIG. 14 showing the location of sensor conductors 150 disposed in the insulated portion of cord 147 between cord conductors 151 and the outside of cord 147.

Figure 16:
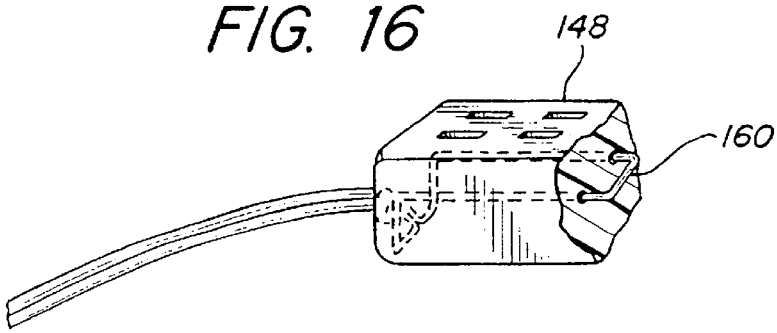
FIG. 16 is a cutaway detail of the extension cord receptacle of FIG. 14.

FIG. 16 is a cutaway detail of the extension cord receptacle 148 showing the sensor wire 160 disposed in the insulated body portion of the receptacle between the receptacle conductors (not shown) and the outside surface of the receptacle. The sensor conductor 160 is connected to form a continuous loop from the plug in module end.

Figure 17:
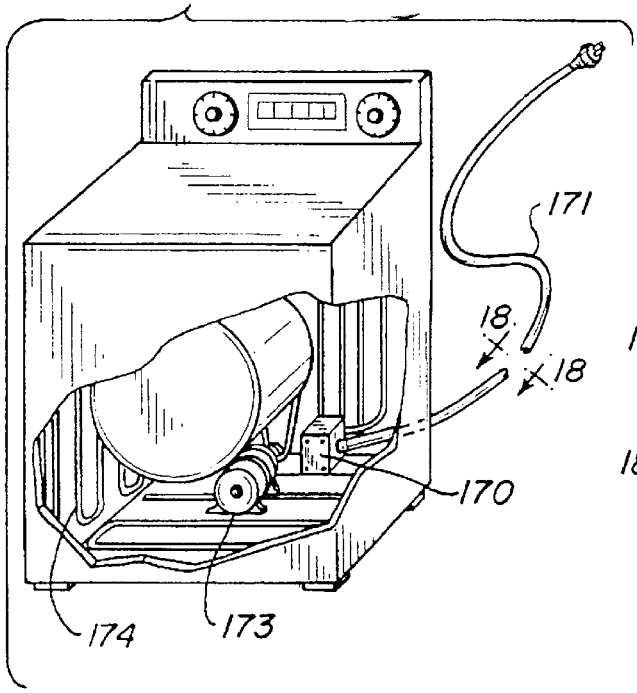
FIG. 17 is a perspective drawing showing the present invention utilized in an appliance.
Figure 18:
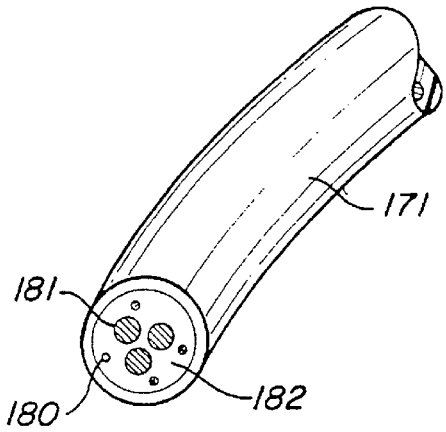

FIG. 17 shows the present invention utilized in an appliance. Sensor/controller module 170 is located inside the appliance. The power cord 171 is connected to the module and an insulated sensor conductor 174 is distributed on the inside surface of the appliance structure as well as on various stationary components such as the motor frame 173 within the appliance. Sensor wire 180 in power cord 171 (see FIG. 18) is connected with sensor conductor 174 in the appliance to form a continuous loop from the sensor/controller module 170. Power cord sensor conductor 180 is disposed in the insulated portion 182 of the power cord between the power conductor 181 and the outside of the power cord 171. The reference conductor (not shown) may be located on an outside surface of the appliance such as the bottom or back of the appliance.

Figure 19:
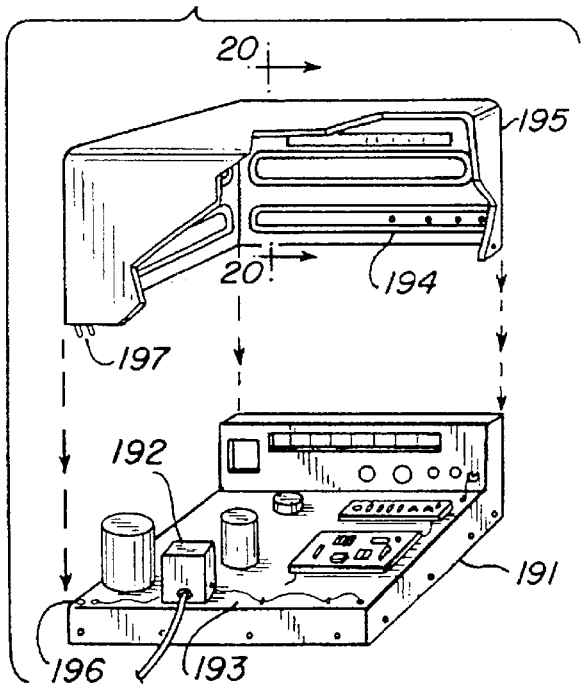
Figure 20:
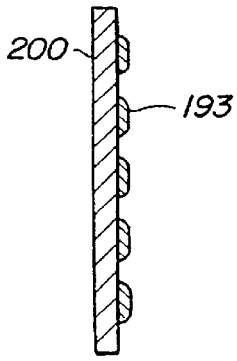
FIG. 20 is a cross-section of the case wall of FIG. 19.

FIG. 19 shows the present invention utilized in an electronic component. Sensor/controller module 192 may be located on the chassis 1 91 or on the plug end (not shown). Sensor conductor 193 is disposed on the chassis in the vicinity of various components. A sensor ribbon 194 is bonded to the inside of the case 195 and forms a continuous loop with sensor conductor 193 when the case is attached to the chassis receptacle 196 by means of a case plug 197. FIG. 20 shows a cross-section of the case wall showing the sensor ribbon 193 bonded to the inside surface of the case wall 200.

Figure 21:
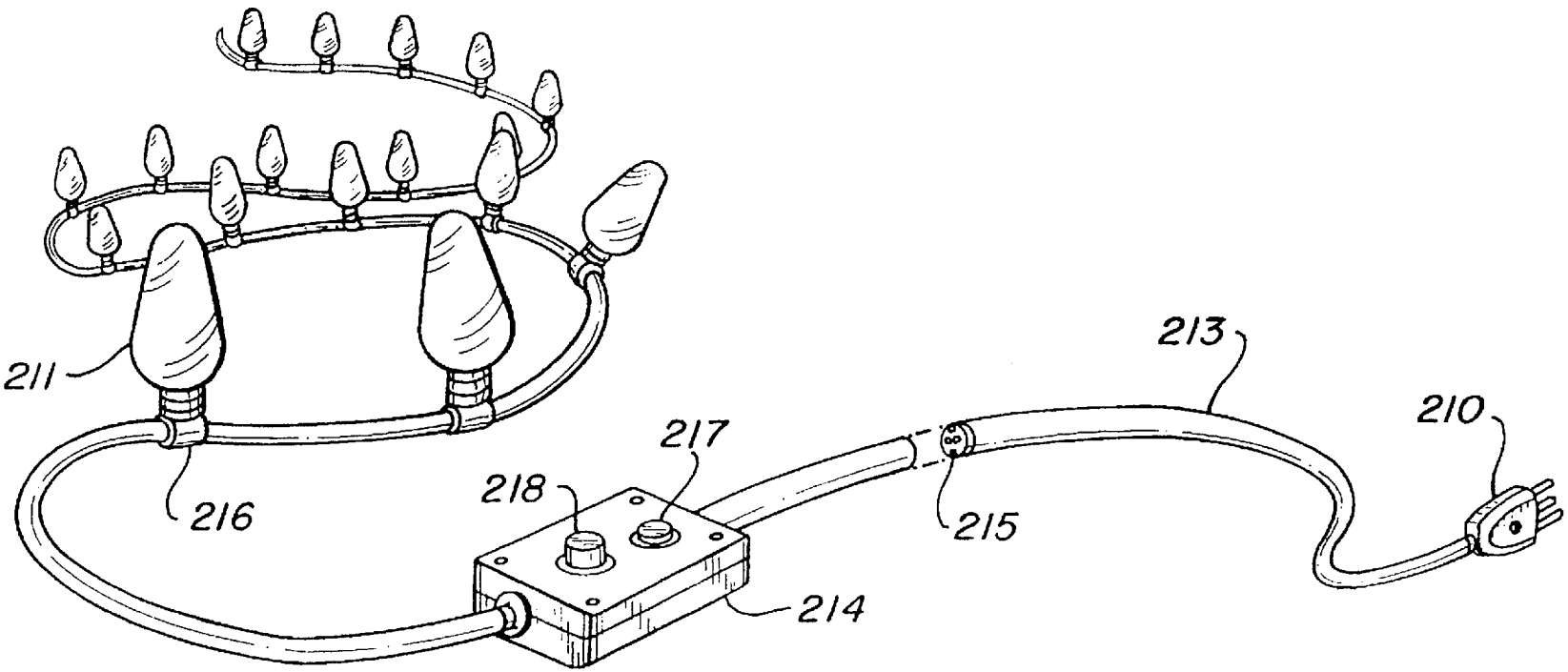
FIG. 21 is a perspective drawing showing the use of the present invention in an ornamental light string.

FIG. 21 shows the use of the present invention in an ornamental light string. Plug 210 supplies power to the lights 211 through cord 213 and sensor/controller module 214. Sensor conductors 215 are distributed in cord 213 and light sockets 216. Sensor/controller module 214 contains combination on/reset switch and indicator light 217 and combination off switch and trip light 218. Reference conductor (not shown) is located on the back of sensor/controller module 214.

Although the description above contains many specifications, these should not be construed as limiting the scope of the invention but as merely providing illustrations of some of the presently preferred embodiments of this invention. For example, a sensor conductor and reference conductor with a negative temperature coefficient of resistivity could be utilized in the present invention. This would require a separate continuity sensor for the sensor conductor since an open in the sensor conductor would be equivalent to a "low" sensed temperature.

Thus the scope of the invention should be determined by the appended claims and their legal equivalents, rather than by the examples given.

What is claimed is:

1. An electrical cord safety device, the device comprising:

an electrical power cord comprising at least one current carrying conductor, insulation surrounding the current carrying conductor, and a cord outside surface;

a sensor conductor for sensing temperature in [the] *said* electrical power cord, [the] *said* sensor conductor disposed in the insulation of [the] *said* electrical power cord as a continuous loop, [the] *said* sensor conductor having a positive temperature coefficient of resistivity, and further disposed between [the] *said* current carrying conductor and [the] *said* outside surface and in a manner such that continuity of [the] *said* sensor conductor is lost upon mechanical damage to the electrical power cord before the current carrying conductor is exposed, whereby [the] *said* sensor conductor further comprises a continuity detecting means;

a reference conductor disposed in the vicinity of [the] *said* electrical power cord for sensing ambient temperature; and a control circuit connected to [the] *said* sensor conductor and [the] *said* reference conductor, [the] *said* control circuit comparing a first electrical quantity representative of [the] *said* sensor conductor temperature and a second electrical quantity representative of [the] *said* reference sensor temperature and interrupting current to [the] *said* current carrying conductor upon a predetermined difference between [the] *said* first electrical quantity and [the] *said* second electrical quantity.

2. The device of claim 1 wherein [the] *said* sensor conductor is disposed in a parallel relationship with [the] *said* current carrying conductor.

3. The device of claim 1 wherein [the] *said* sensor conductor is disposed in a sinusoidal shape along [the] *said* current carrying [carrying] conductor.

4. The device of claim 1 wherein [the] *said* sensor conductor is disposed in a helical shape surrounding [the] *said* current carrying conductor.

5. The device of claim 1 wherein [the] *said* sensor conductor comprises a conductive polymer strip.

6. An electrical safety device, the device comprising:

a case for an electrical component, [the] *said* case comprising an outside surface;

a current carrying conductor disposed inside [the] *said* case;

a sensor conductor for sensing temperature in [the] *said* case, [the] *said* sensor conductor disposed in [the] *said* case as a continuous loop, [the] *said* sensor conductor having a positive temperature coefficient and further disposed between [the] *said* current carrying conductor and [the] *said* outside surface of [the] *said* case and in a manner such that continuity of [the] *said* sensor conductor is lost upon mechanical damage to [the] *said* case before [the] *said* current carrying conductor is exposed, whereby [the] *said* sensor conductor further comprises a continuity sensing means;

a reference conductor disposed in the vicinity of [the] *said* case for sensing ambient temperature; and a control circuit connected to [the] *said* sensor conductor and [the] *said* reference conductor, [the] *said* control circuit comparing a first electrical quantity representative of [the] *said* sensor conductor temperature and a second electrical quantity representative of [the] *said* reference sensor temperature and interrupting current to [the] *said* current carrying conductor upon a predetermined difference between [the] *said* first electrical quantity and [the] *said* second electrical quantity whereby [the] *said* device acts to detect a high temperature in [the] *said* case as compared to [the] *said* ambient temperature.

7. The device of claim 6 wherein [the] *said* case comprises an inside surface and [the] *said* sensor conductor is a conductive foil disposed in [the] *said* inside surface of [the] *said* case.

*8. An electrical power cord including an insulated electrical conductor portion for use in connection with a control circuit configured for measuring resistance, said control circuit configured for initiating a control action upon its detection of a predetermined resistance, said electrical*

*power cord being substantially elongate, having a length, and comprising:*

*an electrical power cord portion itself including along its length a substantially elongate current carrying conductor portion configured to pass electrical current, said current carrying conductor portion extending substantially straight along said length of said insulated electrical conductor portion such that said current carrying conductor portion is approximately as long as said insulated electrical conductor portion;*

*insulation at least partially surrounding said current carrying conductor portion, said insulation defining an insulated electrical conductor outside surface portion; and*

*a substantially elongate sensor conductor portion for sensing temperature within said insulation, said elongate sensor conductor portion extending along said length of said insulated electrical conductor portion but curving at least partially laterally relative to said conductor portion length such that said elongate sensor conductor portion is longer than said insulated electrical conductor portion, said sensor conductor portion comprising a material having a change in resistance with temperature whereby a change in the temperature of said sensor conductor portion results in a change in resistance of said sensor conductor portion, and said sensor conductor portion further disposed between said current carrying conductor portion and said insulated electrical conductor outside surface portion in a manner such that continuity of said sensor conductor portion tends to be lost upon mechanical damage of said insulation before said current carrying conductor portion is exposed,*

*such that said sensor conductor portion provides a dual function of indicating mechanical damage as well as the function of indicating heating of said insulation to allow said control circuit to initiate said control action upon a predetermined resistance of said sensor conductor portion.*

*9. The electrical power cord as claimed in claim 8, wherein said sensor conductor portion has a positive temperature coefficient of resistivity.*

*10. The electrical power cord as claimed in claim 8, wherein said sensor conductor portion is disposed in a helical relationship about the current carrying conductor portion, said helical relationship causing said sensor conductor portion to be longer than said current carrying conductor portion for a given length of insulated electrical conductor portion.*

*11. The electrical power cord as claimed in claim 8, wherein said sensor conductor portion is disposed in a sinusoidal relationship about the current carrying conductor portion, said sinusoidal relationship causing said sensor conductor portion to be longer than said current carrying conductor portion for a given length of insulated electrical conductor portion.*

*12. The electrical power cord as claimed in claim 8, wherein said sensor conductor portion is one of a plurality of coparallel strips disposed radially about the current carrying conductor portion.*

*13. An electrical power cord including an insulated electrical conductor portion for use in connection with a control circuit configured for measuring resistance, said control circuit configured for initiating a control action upon its detection of a predetermined resistance, said electrical power cord being substantially elongate, having a length, and comprising:*

*an electrical power cord portion itself including along its length a substantially elongate current carrying conductor portion configured to pass electrical current, said current carrying conductor portion extending substantially straight along said length of said insulated electrical conductor portion such that said current carrying conductor portion is approximately as long as said insulated electrical conductor portion;*

*insulation at least partially surrounding said current carrying conductor portion, said insulation defining an insulated electrical conductor outside surface portion; and*

*a substantially elongate sensor conductor portion for sensing temperature within said insulation, said elongate sensor conductor portion extending along said length of said insulated electrical conductor portion but curving at least partially laterally relative to said conductor portion length such that said elongate sensor conductor portion is longer than said insulated electrical conductor portion, said sensor conductor portion comprising a material having a change in resistance with temperature whereby a change in the temperature of said sensor conductor portion results in a change in resistance of said sensor conductor portion, and said sensor conductor portion being noninsulated, and said sensor conductor portion being further disposed between said current carrying conductor portion and said insulated electrical conductor outside surface portion in a manner such that continuity of said sensor conductor portion tends to be lost upon mechanical damage of said insulation before said current carrying conductor portion is exposed,*

*such that said sensor conductor portion provides a dual function of indicating mechanical damage as well as the function of indicating heating of said insulation to allow said control circuit to initiate said control action upon a predetermined resistance of said sensor conductor portion.*

*14. The electrical power cord as claimed in claim 13, wherein said sensor conductor portion has a positive temperature coefficient of resistivity.*

*15. The electrical power cord as claimed in claim 13, wherein said sensor conductor portion is disposed in a helical relationship about the current carrying conductor portion, said helical relationship causing said sensor conductor portion to be longer than said current carrying conductor portion for a given length of insulated electrical conductor portion.*

*16. The electrical power cord as claimed in claim 13 wherein said sensor conductor portion is disposed in a sinusoidal relationship about the current carrying conductor portion, said sinusoidal relationship causing said sensor conductor portion to be longer than said current carrying conductor portion for a given length of insulated electrical conductor portion.*

*17. The electrical power cord as claimed in claim 13, wherein said sensor conductor portion is one of a plurality of coparallel strips disposed radially about the current carrying conductor portion.*

*18. An electrical power cord including an insulated electrical conductor portion for use in connection with a control circuit configured for measuring resistance, said control circuit configured for initiating a control action upon its detection of a predetermined resistance, said electrical power cord being substantially elongate and comprising:*

*an electrical power cord portion itself including along its length a substantially elongate current carrying conductor portion configured to pass electrical current;*

*insulation at least partially surrounding said current carrying conductor portion, said insulation defining an insulated electrical conductor outside surface portion; and*

*a plurality of substantially elongate, noncontacting sensor conductor portions for sensing temperature within said insulation, said sensor conductor portions not contacting each other, at least one of said sensor conductor portions comprising a material having a change in resistance with temperature whereby a change in the temperature of said sensor conductor portion results in a change in resistance of said sensor conductor portion, and said same one of said sensor conductor portions further disposed between said current carrying conductor portion and said insulated electrical conductor outside surface portion in a manner such that continuity of said same one of said sensor conductor portions tends to be lost upon mechanical damage of said insulation before said current carrying conductor portion is exposed,*

*such that said same one of said noncontacting sensor conductor portions provides a dual function of indicating mechanical damage as well as the function of indicating heating of said insulation to allow said control circuit to initiate said control action upon a predetermined resistance of said same one of said sensor conductor portions.*

*19. The electrical power cord as claimed in claim 18, wherein said same one of said sensor conductor portions is substantially straight and parallel to said current carrying conductor portion.*

*20. The electrical power cord as claimed in claim 18, wherein said same one of said sensor conductor portions is disposed in a helical relationship about the current carrying conductor portion.*

*21. The electrical power cord as claimed in claim 18, wherein said same one of said sensor conductor portions is disposed in a sinusoidal relationship about the current carrying conductor portion.*

*22. The electrical power cord as claimed in claim 18, wherein said same one of said sensor conductor portions is one of a plurality of coparallel strips disposed radially about the current carrying conductor portion.*

*23. An electrical power cord including an insulated electrical conductor portion for use in connection with a control circuit configured for measuring resistance, said control circuit configured for initiating a control action upon its detection of a predetermined resistance, said electrical power cord being substantially elongate and comprising:*

*an electrical power cord portion itself including along its length a substantially elongate current carrying conductor portion configured to pass electrical current;*

*insulation at least partially surrounding said current carrying conductor portion, said insulation defining an insulated electrical conductor outside surface portion; and*

*a plurality of substantially elongate and parallel sensor conductor portions for sensing temperature within said insulation, at least one of said sensor conductor portions comprising a material having a positive temperature coefficient of resistivity, and said same one of said sensor conductor portions further disposed between said current carrying conductor portion and said insulated electrical conductor outside surface portion in a manner such that continuity of said same sensor conductor portion tends to be lost upon mechanical damage of said insulation before said current carrying conductor portion is exposed,*

*such that said same one of said sensor conductor portions provides a dual function of indicating mechanical damage as well as the function of indicating heating of said insulation to allow said control circuit to initiate said control action upon a predetermined resistance of said sensor conductor portion.*

*24. The electrical power cord as claimed in claim 23, wherein said plurality of substantially elongate and parallel sensor conductor portions comprises two or more sensor conductor portions.*

*25. The electrical power cord as claimed in claim 23, wherein said plurality of substantially elongate and parallel sensor conductor portions comprises three or more sensor conductor portions.*

*26. An electrical power cord including an insulated electrical conductor portion for use in connection with a control circuit configured for measuring resistance, said control circuit configured for initiating a control action upon its detection of a predetermined resistance, said electrical power cord being substantially elongate and comprising:*

*an electrical power cord portion itself including along its length a substantially elongate current carrying conductor portion configured to pass electrical current, said current carrying conductor portion extending along said length of said insulated electrical conductor portion such that said current carrying conductor portion is approximately as long as said insulated electrical conductor portion;*

*insulation at least partially surrounding said current carrying conductor portion, said insulation defining an insulated electrical conductor outside surface portion; and*

*a substantially elongate sensor conductor portion for sensing temperature within said insulation, said elongate sensor conductor portion extending along said length of said insulated electrical conductor portion but curving at least partially laterally relative to said conductor portion length and disposed in a helical relationship about the current carrying conductor portion such that said elongate sensor conductor portion is longer than said insulated electrical conductor portion, said sensor conductor portion comprising a material having a change in resistance with temperature whereby a change in the temperature of said sensor conductor portion results in a change in resistance of said sensor conductor portion, and said sensor conductor portion further disposed between said current carrying conductor portion and said insulated electrical conductor outside surface portion in a manner such that continuity of said sensor conductor portion tends to be lost upon mechanical damage of said insulation before said current carrying conductor portion is exposed,*

*such that said sensor conductor portion provides a dual function of indicating mechanical damage as well as the function of indicating heating of said insulation to allow said control circuit to initiate said control action upon a predetermined resistance of said sensor conductor portion.*

*27. The electrical power cord for use in connection with a control circuit configured for measuring resistance as claimed in claim 26, wherein said current carrying conductor portion extends substantially straight along said length of said insulated electrical conductor portion.*

*28. An electrical power cord including an insulated electrical conductor portion for use in connection with a control circuit configured for measuring resistance, said control circuit configured for initiating a control action upon its detection of a predetermined resistance, said electrical power cord being substantially elongate, having a length, having a transverse cross section having a substantially constant outer periphery, and comprising:*

*an electrical power cord portion itself including along its length a substantially elongate current carrying conductor portion configured to pass electrical current, said current carrying conductor portion extending along said length of said insulated electrical conductor portion and located substantially consistently within said transverse cross section of said electrical conductor portion along the length of said electrical conductor portion;*

*insulation at least partially surrounding said current carrying conductor portion, said insulation defining an insulated electrical conductor outside surface portion; and*

*a substantially elongate sensor conductor portion for sensing temperature within said insulation, said elongate sensor conductor portion extending along said length of said insulated electrical conductor portion and located at different locations within said transverse cross section of said electrical conductor portion along the length of said electrical conductor portion such that said elongate sensor conductor portion is longer than said insulated electrical conductor portion, said sensor conductor portion comprising a material having a change in resistance with temperature whereby a change in the temperature of said sensor conductor portion results in a change in resistance of said sensor conductor portion, and said sensor conductor portion further disposed between said current carrying conductor portion and said insulated electrical conductor outside surface portion in a manner such that continuity of said sensor conductor portion tends to be lost upon mechanical damage of said insulation before said current carrying conductor portion is exposed,*

*such that said sensor conductor portion provides a dual function of indicating mechanical damage as well as the function of indicating heating o said insulation to allow said control circuit to initiate said control action upon a predetermined resistance of said sensor conductor portion.*

*29. The electrical power cord for use in connection with a control circuit configured for measuring resistance as claimed in claim 28, wherein said elongate sensor conductor portion is disposed in a helical relationship about the current carrying conductor portion.*

* * * * *